No. 874,803.         PATENTED DEC. 24, 1907.
A. K. SPINNEY.
NUT LOCK.
APPLICATION FILED MAY 24, 1907.
Fig. 1.
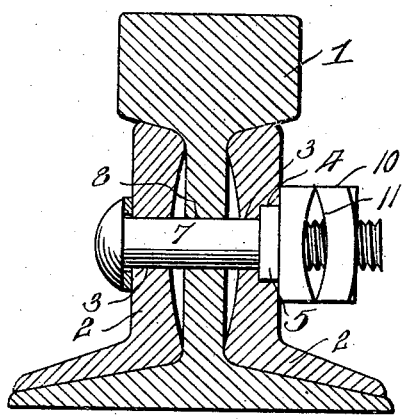
Fig. 2.           Fig. 3.
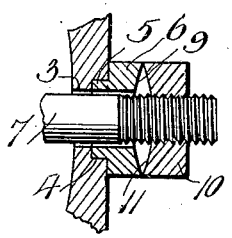    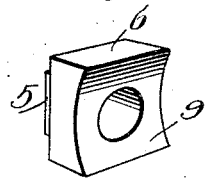
Fig. 4.
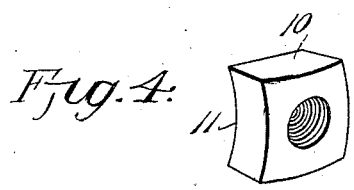
Inventor
Alfred K. Spinney,
Witnesses
Frank Hough
C. Bradway
By Victor J. Evans
Attorney
THE NORRIS PETERS CO., WASHINGTON, D. C.

UNITED STATES PATENT OFFICE.

ALFRED K. SPINNEY, OF TOLEDO, OHIO.

NUT-LOCK.

No. 874,803.　　　　Specification of Letters Patent.　　　　Patented Dec. 24, 1907.

Application filed May 24, 1907. Serial No. 375,533.

*To all whom it may concern:*

Be it known that I, ALFRED K. SPINNEY, a citizen of the United States, residing at Toledo, in the county of Lucas and State of Ohio, have invented new and useful Improvements in Nut-Locks, of which the following is a specification.

This invention relates to nut locks designed for use in connection with rail joints, although they are not necessarily limited to this use.

The invention has for one of its objects to provide a comparatively simple and inexpensive nut lock comprising a spring nut coöperating with a washer which is held from rotating on the bolt as the nut is drawn up.

A further object of the invention is the provision of a nut lock especially intended for rail joints in which one of the fish plates of the latter is provided with non-circular countersunk openings for the bolts, the countersunk portions serving to receive correspondingly shaped projections on the washers of the nut locks.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one of the embodiments of the invention, Figure 1 is a transverse section of a rail joint provided with the improved nut locks. Fig. 2 is a fragmentary sectional view of the members of one of the nut locks. Fig. 3 is a perspective view of the washer. Fig. 4 is a similar view of the nut.

Similar reference characters are employed to designate corresponding parts throughout the several views.

Referring to the drawing, 1 designates a rail for railroads of standard construction, and 2, the fish plate for joining two adjacent rail sections together. These fish plates are of ordinary form except that the bolt-receiving openings 3 of one of the plates are countersunk at 4 in non-circular form. These countersunk openings 4 serve to receive correspondingly shaped projections 5 on the washers 6 of the nut locks.

The washers are assembled freely over the bolts 7 that pass through the openings 3 and 8 of the fish plates and rails in the usual manner. The outer surfaces of the washers are concaved as indicated at 9 and the nuts 10 on the bolts 7 are provided with concaved faces 11 presented to the concaved faces of the washers. By concaving the members in this manner, the nuts 10 can be drawn tightly up against the washers and held under tension.

In practice, two rail sections are placed together and the fish plates positioned thereon in the usual manner and the parts secured together by the desired number of bolts 7. After the bolts are inserted through the openings 3 and 8, the washers 6 are placed on the bolts in such a manner that the projections 5 will enter the countersunk portions of the adjacent fish plate. After this is done, the nuts 10 are screwed on and tightly drawn up against the washers so as to be held under tension. A nut lock of this character serves effectively to hold the parts of the rail joint together and the cost of construction is comparatively small.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative and that such changes may be made when desired, as are within the scope of the claims.

Having thus described the invention, what I claim is:—

1. A nut lock comprising a bolt, members secured together by the bolt and one having a non-circular countersunk opening, a washer having a concavity on one side and a non-circular projection on the opposite side engaging in the countersunk opening, and a nut screwed on the bolt and having a concaved surface presented to that of the washer.

2. The combination of rail sections, fish plates one having non-circular countersunk openings, bolts passing through the fish plates and rail sections, washers on the bolts having non-circular projections engaging in the countersunk openings, and nuts on the bolts bearing against the washers, the opposed faces of the nuts and washers being concaved.

In testimony whereof, I affix my signature in presence of two witnesses.

ALFRED K. SPINNEY.

Witnesses:
H. H. WINKELJOHN,
L. U. WIKE.